Aug. 29, 1950
A. FERNANDEZ-YAÑEZ Y MARTINEZ DEL CAMPO ET AL
2,520,353
TIRE PRESSURE ALARM SWITCH
Filed Dec. 15, 1945
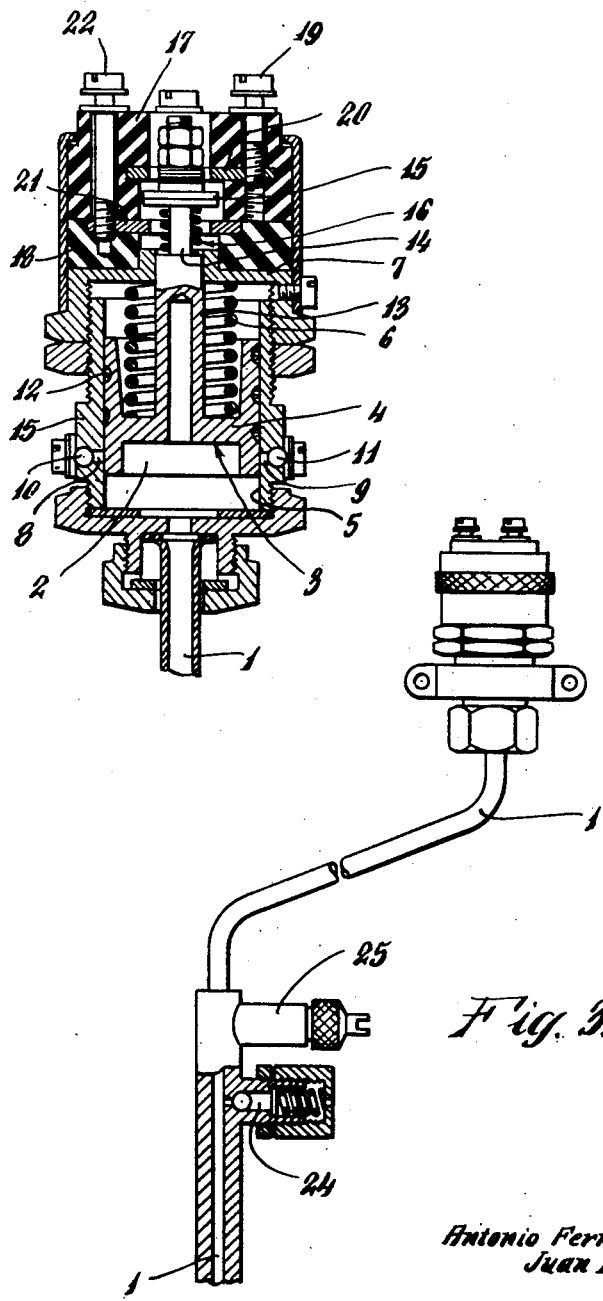
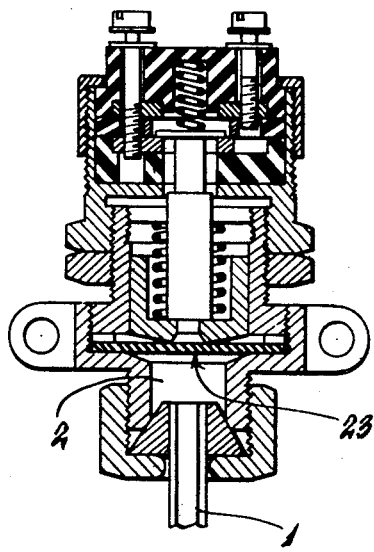
INVENTORS.
Antonio Fernandez Yañez y Martinez del Campo
Juan Fernandez Yañez y Ozores
BY Haseltine, Lake & Co.
ATTORNEYS.

UNITED STATES PATENT OFFICE 2,520,353

TIRE PRESSURE ALARM SWITCH

Antonio Fernandez-Yañez y Martinez del Campo and Juan Fernandez-Yañez y Ozores, Madrid, Spain Application December 15, 1945, Serial No. 635,398
In Spain August 1, 1945

4 Claims. (Cl. 200—58)

The present invention refers to a safety-device indicating continuously the pressure in pneumatic tires. All kinds of vehicles, motor cars or trailers running on pneumatic tires can be fitted with same.

It is well known that the initial pressure of the tires may vary during travel, either increasing by the action of heat or diminishing in consequence of leakage or damage which can occur to the tire in course of travel. These variations of pressure which are difficult for the driver to determine when travelling can cause the destruction of the whole tire. Such accidents occur frequently, but they could be easily prevented if there were some suitable means for the indication of the pressure in each of the wheels and a safety-valve for the same. In order to fulfill this purpose, the device constituting the subject-matter of this invention has been conceived in such a manner that the pressure in each pneumatic tire of the vehicle, motor car or trailer can be read at any moment on the dash-board of the car. Thus, immediately and before any greater damage can occur, the driver can take the necessary steps to reestablish the normal pressure conditions.

The annexed drawing shows by way of non-limiting example two features of the new device wherein:

Fig. 1 is a main sectional view through the pressure regulating device operated by a piston, whilst Fig. 2 shows a sectional view through a similar embodiment in which the piston is completed by means of an elastic membrane; and Fig. 3 is an exterior almost to full scale of the device according to Fig. 2.

The apparatus communicates with the inside of the pneumatic tire by means of a tube 1 establishing in the chamber 2 the same pressure as in the tire proper. For this purpose the device shown by the Figures 1 to 3 is mounted in the wheel, preferably under the central cover of same.

Inside the chamber 2 (Fig. 1) the air is pressing on the lower surface 3 of a piston 4 which slides in the cylinder 5. Upon this piston an opposed spring 6 is actuating. Said spring is located over the piston 4, a cover 7 holding it in its due position, according to Fig. 1. The strength of the spring is graduated in such a manner that the piston impelled by the pneumatic pressure of the tire is elevated to the necessary extent to uncover two openings 8 and 9 just when the pressure reaches its maximum admissible limit, the latter being previously established in accordance with the characteristic features of the tire. Due to two suitably arranged ball valves 10 and 11, the openings 8 and 9 allow the air to pass only from inside outwardly, but not in the opposite direction.

In order to assure an hermetical seal between the piston 4 and the cylinder 5, the former bears a semi-circularly shaped groove 12 filled with oil in order to prevent the air from unduly penetrating in direction to the other side of the piston 4.

The reduced end 14 integral with the central stem 13 of the piston 4 bears a contact-plate 15 seated on a small spiral spring 16 allowing said plate a small amount of sliding play axially of the stem of the piston.

When the piston 4 is elevated by an excessiveness of pressure which could occasionally arise in the pneumatic tire, the plate 15 will establish contact with the metallic plate 20. This electrically insulated plate 20 is fitted in the upper parts 17 and 18 of the device. Both parts 17, 18 are preferably made of an insulating material.

A screw 19 which is electrically and mechanically united with the contact plate 20, constitutes the electrical circuit between the piston 4 and the plate 20 to the outside of the device.

The spiral-spring 16 is intended for receiving the pressure of the piston 4 in case the latter is too much elevated in consequence of an excess of pressure. By means of said spring 16 the contact-plate 15 will be prevented from destroying or deforming the plate 20.

The piston 4 descending completely in consequence of deficiency in the pressure of the pneumatic tire, the plate 15 will enter into electrical contact with another metallic plate 21 which is suitably disposed under said movable plate 15. The plate 21 is electrically and mechanically united with another screw 22 projecting outside the device.

From each of said screws 19 and 22, an electric cable leads to a contact sliding on a conducting cylinder which is mounted on the chassis of the car constituting a continuous lead for the electric current applied to each of said screws 19 and 22. Each of the latter is connected with the circuit of an electric lamp mounted on the dash-board. On the other hand the whole body of the device constitutes the other terminal for both circuits.

The piston 4 simultaneously acts as a safety-valve uncovering the before mentioned openings 8 and 9.

Fig. 2 is another example of the device according to this invention in which the piston is completed by an elastic membrane 23, interposed between the piston and the interior of the tire. There is no essential difference in the operation of this alternative device, except that the safety valve then has to be provided on the side of the membrane opposite to the piston, for example in the form of a separate ball-valve 24 near the inflating valve 25.

What we claim is:

1. In a device for indicating the pressure in a pneumatic tire, a cylinder communicating at one end with the inside of the tire, a piston movable in said cylinder, resilient means interposed between said piston and the other end of said cylinder, said piston being held in a balanced position by the opposed forces of said resilient means and the pressure in the tire, a movable contact member actuated by said piston, a pair of stationary contact members spaced apart from each other and spaced from said movable contact member when said piston is in balanced position, said movable contact member arranged and constructed to contact one of said stationary members when the piston is moved by a variation in tire pressure, said cylinder having at least one opening in the side wall thereof intermediate said balanced position and the other end of said cylinder, whereby said piston will uncover said opening to allow escape of air through said passage when the pressure in the tire exceeds the force of said resilient means, and a non-return valve controlling said opening.

2. In a device for indicating the pressure in a pneumatic tire, a cylinder communicating at one end with the inside of the tire, a piston movable in said cylinder, resilient means interposed between said piston and the other end of said cylinder, said piston being held in a balanced position by the opposed forces of said resilient means and the pressure in the tire, a movable contact member actuated by said piston, a pair of stationary contact members spaced apart from each other and spaced from said movable contact member when said piston is in balanced position, said movable contact member arranged and constructed to contact one of said stationary members when the piston is moved by a variation in tire pressure, said piston having a stem movable therewith extending through the other end of said cylinder, said movable contact member being resiliently secured to the outer extremity of said stem for sliding longitudinal movement thereof, whereby said piston and stem may be moved the maximum amount in the direction of the other end of said cylinder to override the movable contact member in engagement with one of the stationary contact members.

3. In a device for indicating the pressure in a pneumatic tire, a cylinder communicating at one end with the inside of the tire, a piston movable in said cylinder, resilient means interposed between said piston and the other end of said cylinder, said piston being held in a balanced position by the opposed forces of said resilient means and the pressure in the tire, a movable contact member actuated by said piston, a pair of stationary contact members spaced apart from each other and spaced from said movable contact member when said piston is in balanced position, said movable contact member arranged and constructed to contact one of said stationary members when the piston is moved by a variation in tire pressure, said piston having a stem movable therewith extending through the other end of said cylinder, said movable contact member being resiliently secured to the outer extremity of said stem for sliding longitudinal movement thereof, whereby said piston and stem may be moved the maximum amount in the direction of the other end of said cylinder to override the movable contact member in engagement with one of the stationary contact members, said cylinder having at least one opening in the side wall thereof intermediate said balanced position and the other end of said cylinder, whereby said piston will uncover said opening to allow escape of air through said passage when the pressure in the tire exceeds the force of said resilient means, and a non-return valve controlling said opening.

4. In a device for indicating the pressure in a pneumatic tire, a cylinder communicating at one end with the inside of the tire, a piston movable in said cylinder, resilient means interposed between said piston and the other end of said cylinder, said piston being held in a balanced position by the opposed forces of said resilient means and the pressure in the tire, a movable contact member actuated by said piston, a pair of stationary contact members spaced apart from each other and spaced from said movable contact member when said piston is in balanced position, said movable contact member arranged and constructed to contact one of said stationary members when the piston is moved by a variation in tire pressure, said cylinder having at least one opening in the side wall thereof intermediate said balanced position and the other end of said cylinder, whereby said piston will uncover said opening to allow escape of air through said passage when the pressure in the tire exceeds the force of said resilient means.

ANTONIO FERNANDEZ-YAÑEZ
MZ. DEL CAMPO.
JUAN FERNANDEZ-YAÑEZ OZORES.

REFERENCES CITED

The following references are of record in the file of this patent:

UNITED STATES PATENTS

| Number | Name | Date |
|---|---|---|
| 1,019,557 | Terpening | Mar. 5, 1912 |
| 1,115,022 | Quick | Oct. 27, 1914 |
| 1,137,116 | Brown | Apr. 27, 1915 |
| 1,956,578 | Johnston | May 1, 1934 |
| 2,040,891 | Wright et al. | May 19, 1936 |
| 2,057,387 | Loeb | Oct. 13, 1936 |
| 2,113,957 | Androsky | Apr. 12, 1938 |
| 2,127,187 | Riusech | Aug. 16, 1938 |
| 2,190,117 | Griffith | Feb. 13, 1940 |
| 2,205,168 | Guthrie | June 18, 1940 |
| 2,248,047 | Addy et al. | July 8, 1941 |
| 2,249,426 | Jones et al. | July 15, 1941 |
| 2,258,384 | Harrington | Oct. 7, 1941 |
| 2,439,561 | Cressey | Apr. 13, 1948 |

OTHER REFERENCES

Article in Science and Invention, September 1928, page 410.